US012586926B2

(12) United States Patent
Jaafar et al.

(10) Patent No.: US 12,586,926 B2
(45) Date of Patent: Mar. 24, 2026

(54) RECONFIGURABLE ANTENNA ARRAY

(71) Applicant: Commissariat à l'énergie atomique et aux énergies alternatives, Paris (FR)

(72) Inventors: Hussein Jaafar, Grenoble (FR); Serge Bories, Grenoble (FR); Raffaele D'Errico, Grenoble (FR)

(73) Assignee: Commissariat à l'énergie atomique et aux énergies alternatives, Paris (FR)

(*) Notice: Subject to any disclaimer, the term of this patent is extended or adjusted under 35 U.S.C. 154(b) by 0 days.

(21) Appl. No.: 18/690,611

(22) PCT Filed: Sep. 14, 2022

(86) PCT No.: PCT/EP2022/075574
§ 371 (c)(1),
(2) Date: Mar. 8, 2024

(87) PCT Pub. No.: WO2023/041607
PCT Pub. Date: Mar. 23, 2023

(65) Prior Publication Data

US 2024/0421499 A1 Dec. 19, 2024

(30) Foreign Application Priority Data

Sep. 15, 2021 (FR) ..................................... 21 09668

(51) Int. Cl.
*H01Q 21/24* (2006.01)
*H01Q 5/321* (2015.01)
*H01Q 21/06* (2006.01)

(52) U.S. Cl.
CPC ........... *H01Q 21/065* (2013.01); *H01Q 5/321* (2015.01); *H01Q 21/24* (2013.01)

(58) Field of Classification Search
CPC H01Q 5/35; H01Q 5/50; H01Q 5/321; H01Q 9/045; H01Q 9/0435; H01Q 21/24; H01Q 21/065
See application file for complete search history.

(56) References Cited

U.S. PATENT DOCUMENTS 5,926,137 A 7/1999 Nealy
6,147,648 A * 11/2000 Granholm ............ H01Q 21/065 343/700 MS (Continued)

FOREIGN PATENT DOCUMENTS

EP 3 105 818 A1 12/2016

OTHER PUBLICATIONS

International Search Report issued Dec. 5, 2022 in PCT/EP2022/075574 , filed on Sep. 14, 2022, 8 pages (with English Translation).

(Continued)

*Primary Examiner* — Tung X Le
(74) *Attorney, Agent, or Firm* — Oblon, McClelland, Maier & Neustadt, L.L.P.

(57) ABSTRACT

A reconfigurable antenna array including a plurality of identical elementary unit cells, each unit cell having at least one symmetry and being a square unit cell, and including a radiating element having at least four ports distributed in pairs on either side of each median on one side of a unit cell, the antenna array additionally including a reconfigurable switching circuit configured to generate three distinct connection states between each port of each pair of facing ports, each port of a pair belonging to two distinct elementary unit cells that are vertically stacked or horizontally adjacent within the antenna array.

12 Claims, 5 Drawing Sheets

(56) References Cited

U.S. PATENT DOCUMENTS

| | | | | |
|---|---|---|---|---|
| 9,391,375 | B1 * | 7/2016 | Bales | H01Q 21/064 |
| 10,886,630 | B2 * | 1/2021 | Onaka | H01Q 21/24 |
| 11,128,327 | B2 * | 9/2021 | Abbasi | H03F 3/45475 |
| 11,233,337 | B2 * | 1/2022 | Ryoo | H01Q 9/0407 |
| 11,735,832 | B2 * | 8/2023 | Ueda | H01Q 21/24 343/893 |
| 11,777,228 | B2 * | 10/2023 | Povalac | H01Q 5/35 343/702 |
| 11,916,315 | B2 * | 2/2024 | Underwood | H01Q 3/36 |
| 2004/0201526 | A1 | 10/2004 | Knowles et al. | |
| 2007/0291831 | A1 | 12/2007 | Lee et al. | |
| 2012/0146869 | A1 | 6/2012 | Holland et al. | |
| 2017/0194703 | A1 * | 7/2017 | Watson | H01Q 1/523 |
| 2020/0274242 | A1 | 8/2020 | Wang et al. | |
| 2020/0313294 | A1 * | 10/2020 | Morita | H01Q 21/0025 |
| 2022/0302603 | A1 * | 9/2022 | Chieh | H01Q 21/0075 |

OTHER PUBLICATIONS

French Preliminary Search Report issued Apr. 22, 2022 in FR application 21 09668, filed on Sep. 15, 2021, 4 pages (with English Translation of categories of cited documents).

Song et al. "An Efficient Approach for Optimizing Frequency Reconfigurable Pixel Antennas Using Genetic Algorithms", IEEE Transactions on Antennas and Propagation, vol. 62, No. 2, Feb. 2014, 12 pages.

Ali et al. "A MEMS Reconfigurable Pixel Microstrip Patch Antenna for Conformal Load Bearing Antenna Structures (CLAS) Concept", IEEE 2014, 2 pages.

Ji et al. "A Reconfigurable Partially Reflective Surface Antenna with Enhanced Beam Steering Capability", 13th European Conference on Antennas and Propagation (EuCAP 2019), 3 pages.

* cited by examiner

RECONFIGURABLE ANTENNA ARRAY

CROSS-REFERENCE TO RELATED APPLICATIONS

This application is a U.S. national phase application of International Application No. PCT/EP2022/075574 filed Sep. 14, 2022, which designated the U.S. and claims priority to French Patent Application No. 21 09668 filed Sep. 15, 2021, the entire contents of each of which are incorporated herein by reference.

FIELD

The present invention relates to a reconfigurable antenna array comprising a plurality of identical elementary unit cells, each unit cell having at least one symmetry, in particular a square unit cell, and comprising a radiating element having: a minimum of four ports distributed in pairs on either side of each median of a unit cell side.

The invention further relates to a ground-penetrating radar comprising such a reconfigurable antenna array.

The invention is in the field of antenna arrays, in particular miniature antenna arrays apt to meet many requirement constraints in terms of bandwidth, multi-polarization, decoupling, antenna density, etc.

BACKGROUND

More precisely, the invention relates to the family of array antennas with reconfigurable electromagnetic properties comprising a plurality of identical elementary unit cells, also called pixels of the antenna array considered, an elementary unit cell or pixel corresponding to the pattern of the array reproduced identically over the entire antenna array by translation according to one or two dimensions. It should be noted that a unit cell is configured to have a smaller size than an antenna element (i.e. antenna) of the array as such, an antenna element suitable for providing radiation in one or two distinct polarizations being configured to correspond to a combination comprising one or a plurality of elementary unit cells.

As an example, a dipole strand forms the elementary unit cell of a dipole corresponding to an antenna element as such.

More precisely, the present invention aims to make optimum use of the array surface occupied by the radiating elements of each elementary unit cell of the array and falls more particularly within the field of application of antenna arrays with shared radiating elements, for producing antennas reconfigurable in frequency, geometry or polarization.

In the prior art, antenna arrays with shared radiating elements are known, such as described in particular in documents U.S. Pat. No. 5,926,137, EP 3 105 818, and US 2012/0146869 A1. However, in the antenna array of document U.S. Pat. No. 5,926,137, it should be noted that the excitation position of each of the radiating elements is unique, which prevents modularity and the obtaining of multiple radiation configurations from the same antenna array. The antenna array disclosed in document EP 3 105 818 discloses a possible reconfiguration in terms of geometry and position by imposing a predetermined and identical number of radiating elements forming each antenna and a common polarization, namely the circular polarization obtained by means of an ad hoc feed array. Finally, the antenna array disclosed in the document US 2012/0146869 A1 proposes an antenna array with simultaneous dual polarization with specific and non-reconfigurable common mode excitation so that such an antenna array is not easily reconfigurable in frequency either.

SONG SICHAO et al. disclosed in the article entitled "*An efficient approach for Optimizing Frequency Reconfigurable Pixel Antennas Using Genetic Algorithms*" a reconfigurable antenna array also with a single excitation the location of which is fixed and non-reconfigurable, which limits the compatibility thereof with a multi-antenna array.

In other words, the current solutions of the prior art do not use the radiating surface available optimally, the number of constituent radiating elements of such existing arrays being fixed, which limits the number of excitable antennas and the geometric shapes thereof.

SUMMARY

The subject matter of the invention is to remedy the drawbacks of the prior art by proposing an alternative antenna array architecture for an optimal use of the available array surface of radiating elements and the synthesis of antenna arrays (i.e. multi-antennas) both reconfigurable in frequency in order, in particular, to sequentially access a very wide band, e.g. of several octaves, and/or reconfigurable in polarization in order, in particular, to address two orthogonal polarizations, e.g. along an axis Ox and an axis Oy, respectively.

To this end, the invention proposes a reconfigurable antenna array comprising a plurality of identical elementary unit cells, each unit cell having at least one symmetry, in particular a square unit cell, and comprising a radiating element having: at least four ports distributed in pairs on either side of each median of a unit cell side, the antenna array further comprising a reconfigurable switching circuit configured to generate three distinct connection states between each port of each pair of facing ports, each port of a pair belonging to two distinct elementary unit cells, superimposed vertically or adjacent horizontally, within said antenna array.

Advantageously, the antenna array architecture proposed according to the present invention makes possible, via the geometry of the elementary unit cell combined with the reconfigurable switching circuit, the sequential selection of the arrangement of the excitations of each unit radiating element located within an elementary unit cell of said antenna array. In other words, the antenna array architecture proposed according to the present invention makes it possible to act on the way in which the elementary unit cells are connected to each other in order to obtain the desired radiation in terms of polarization, phase center, density of radiating elements, inter-radiating element distance of the array, frequency bands, etc. More precisely, the expression "arrangement of the excitations of each unit radiating element" means that each port (also called RF radio frequency access) is configured to be supplied via the reconfigurable switching circuit, distinctly from one port to another, by an RF signal source or receiver.

The antenna array according to the invention can further have one or a plurality of the features below, taken independently or according to all technically feasible combinations:

- the three connection states correspond to:
  - a short circuit;
  - an excitation;
  - an open-circuit;
- the radiating element within the elementary unit cell corresponds to a circular pattern;

at least one antenna of said antenna array is formed by at least two vertically and/or horizontally contiguous elementary unit cells, said at least two contiguous elementary unit cells being connected, via said reconfigurable switching circuit, by means of an excited connection of the ports of the pair of ports facing said at least two contiguous elementary unit cells;

at least part of said antenna array is square and formed by four elementary unit cells contiguous in pairs, vertically and horizontally, and configured to be excited in four distinct configurations associated, via said reconfigurable switching circuit, with a distinct arrangement from one configuration to another, of connections between each port of each pair of facing ports, respectively, each port of a pair belonging to two distinct elementary unit cells vertically or horizontally superimposed within said square portion formed by four elementary unit cells contiguous in pairs, vertically and horizontally;

two of said four distinct configurations are associated with a horizontal polarization and two of said four distinct configurations are associated with a vertical polarization;

at least one antenna of said antenna array is H-shaped and comprises two identical vertical branches, each comprising at least five vertically contiguous elementary unit cells, the two identical vertical branches being connected to each other by a horizontal central branch comprising at least four horizontally contiguous elementary unit cells, each elementary unit cell located at one of the ends of the horizontal central branch corresponding to the third elementary unit cell of each of the two vertical branches, respectively;

said H-shaped antenna is configured to be excited, via the switching circuit, by means of an excited connection of the ports of the pair of ports facing said at least two central contiguous elementary unit cells of said horizontal central branch, the facing ports of the other contiguous elementary unit cells forming said H-shaped antenna being placed in a short-circuit state, the facing ports of elementary unit cells of said array, external to said H-shaped antenna, being placed in an open-circuit state.

for each pair of facing ports, belonging to two distinct elementary unit cells superimposed vertically or horizontally, the reconfigurable switching circuit comprises an electronic assembly comprising at least:

- a balun configured to convert an input electrical signal into differential mode;
- two single-pole switches with one input and two SPDT outputs,
- a single-pole SPST jet switch;

each elementary unit cell is placed in an electromagnetic cubic cavity;

each electronic assembly associated with each pair of facing ports is integrated within a metal wall of said cubic cavity, said wall separating said ports of said pair.

According to another aspect, the invention further relates to a ground-penetrating radar comprising such a reconfigurable antenna array.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION

Figure 1:
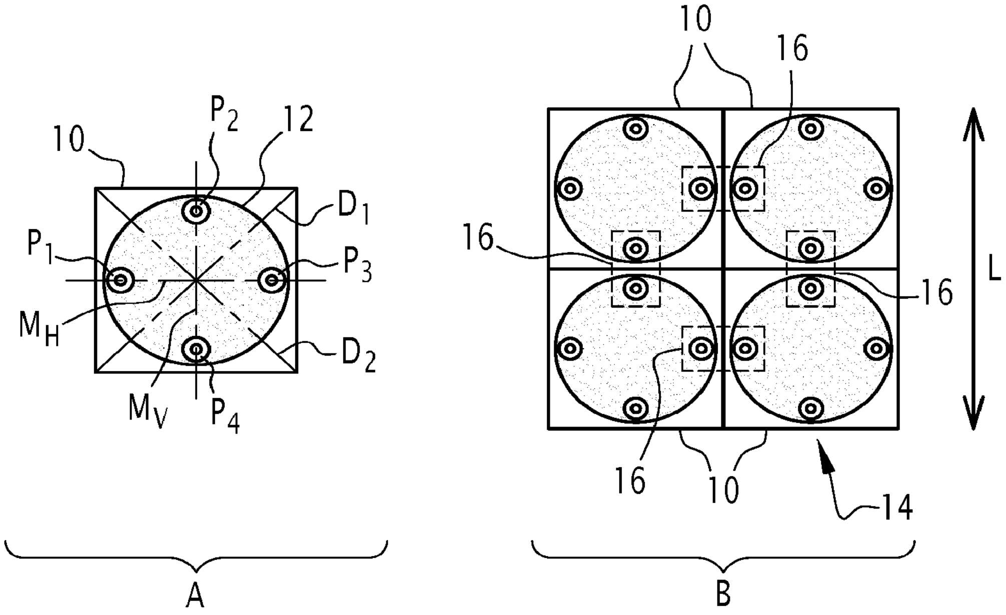
FIG. 1 schematically illustrates an elementary unit cell and a first example of an antenna array or part of an antenna array according to an embodiment of the invention.

On the side A, FIG. 1 firstly schematically illustrates the geometry of an elementary unit cell 10, also called a pixel, of an antenna array according to the present invention.

More precisely, each elementary unit cell 10 (i.e. pixel) is, according to the embodiment shown in FIG. 1, square and comprises a radiating element 12. According to another example, not shown, each elementary unit cell has a shape distinct from the square shape shown in FIG. 1, such a distinct shape exhibiting at least one symmetry such as a diamond, an octagon, a disk, etc. However, it should be noted that a square elementary unit cell is optimal in terms of radiant surface filling.

According to the illustration shown in FIG. 1, the radiating element 12 within the square unit cell corresponds to a circular conductor pattern. Such a circular pattern has a symmetry along the two diagonals $D_1$ and $D_2$ of said square of unit cell 10.

As an alternative, subsequently illustrated, in particular, in FIG. 5, any other shape of radiating element configured to be housed within the square elementary unit cell 10 is suitable for use provided that such shape also has a symmetry along the two diagonals $D_1$ and $D_2$ of said square of cell 10.

Furthermore, according to the present invention, the radiating element 12 also has four ports (also called RF radio frequency access) $P_1$, $P_2$, $P_3$, $P_4$ distributed two by two on either side of each horizontal median MH and vertical median $M_V$ of the square of elementary unit cell 10. More precisely, in the example shown in FIG. 1, the ports $P_1$ and $P_3$ are located at each end, left and right, respectively, of the horizontal median MH of the radiating element 12, and the ports $P_2$ and $P_4$ are located at each end, upper and lower, respectively, of the vertical median $M_V$ of the radiating element 12.

Such an elementary unit cell geometry A reproduced identically over the entire antenna array by translation in one or two dimensions makes the antenna array according to the present invention modular (i.e. reconfigurable especially in terms of radiation), because such geometry makes possible a sequential selection of the radiating elements 12 to be excited via a reconfigurable switching circuit (also called power supply network of the antenna array), not shown, configured to control the individual connection of each RF radio 20 frequency access port.

"Controlling the individual connection of each access port" means that each port can be fed by an RF signal source or receiver, which makes the application of the present invention compatible with a multi-antenna array, in particular such as a MIMO antenna, because the location of the excitation as such is then reconfigurable.

As an optional addition (not shown), each elementary unit cell (10) is placed in an electromagnetic cubic cavity, e.g. of dimension L/2×L/2×L/2, with L/2 the dimension of one of the four sides of the elementary unit cell 10. According to another example, the cavity height has a cavity height distinct from the cavity length and/or from the cavity width. Such placement in an electromagnetic cavity is implemented in particular for an antenna array application for ground-penetrating radar (GPR) in order to focus the radiation of the antenna array towards the ground and prevent any interference with RF applications above the ground.

On the side B, FIG. 1 further illustrates a first example of an antenna array or of part 14 of an antenna array according to an embodiment of the invention, the part 14 corresponding to a square antenna array formed by four elementary unit cells 10 contiguous in pairs, vertically and horizontally (i.e. vertically superimposed and horizontally adjacent). In other words, the antenna array corresponds to 2×2 elementary unit cells 10.

Such an antenna array 14 formed by four elementary unit cells 10 has a surface area equal to L×L, with L being the dimension of one of the four sides of the antenna array 14, an elementary unit cell 10 having an equal surface L/2×L/2 area, with L/2 the dimension of one of the four sides of the elementary unit cell 10.

Part B of FIG. 1 illustrates the way of connecting the elementary unit cells 10 (i.e. the pixels) to each other via the reconfigurable switching circuit proposed according to the present invention for obtaining the desired radiation in terms of polarization, phase center, etc.

Indeed, as illustrated in part B of FIG. 1, the antenna array or part of the antenna array 14 comprises four pairs 16 of facing ports, namely:

- an upper horizontal pair 16 of ports $P_3$ and $P_1$ facing each other, the port $P_3$ belonging to the upper left elementary array unit cell while the port $P_1$ belongs to the upper right elementary array unit cell,
- a lower horizontal pair 16 of ports $P_3$ and $P_1$ facing each other, the port $P_3$ belonging to the lower left elementary array unit cell while the port $P_1$ belongs to the lower right elementary array unit cell,
- a left vertical pair 16 of ports $P_4$ and $P_2$ facing each other, the port PA belonging to the upper left elementary unit cell while the port $P_2$ belongs to the lower left elementary array unit cell,
- a vertical right pair 16 of ports $P_4$ and $P_2$ facing each other, the port $P_4$ belonging to the upper right elementary array unit cell while the port $P_2$ belongs to the lower right elementary array unit cell.

According to an aspect not shown in FIG. 1, the reconfigurable switching circuit (also called the power supply network of the antenna array), not shown, serves to individually excite each pair 16 of ports facing each antenna array or part of an antenna array 14, so that, in a modular way, from the antenna array or part of the antenna array 14, it is possible according to the present invention to excite four distinct antennas as illustrated below in relation to FIG. 2, each antenna comprising two contiguous elementary unit cells 10 (i.e. two contiguous pixels) by being superposed vertically, or adjacent horizontally, within the antenna array or part of the antenna array 14.

Indeed, advantageously, the reconfigurable switching circuit (also called the power supply network of the antenna array) of the antenna array according to the present invention is specifically configured to generate three distinct connection states between each port of each pair of facing ports, each state and associated electronic circuit being described hereinafter in relation to FIG. 3.

More precisely, the three connection states correspond to a short circuit, an excitation and an open-circuit.

Figure 2:
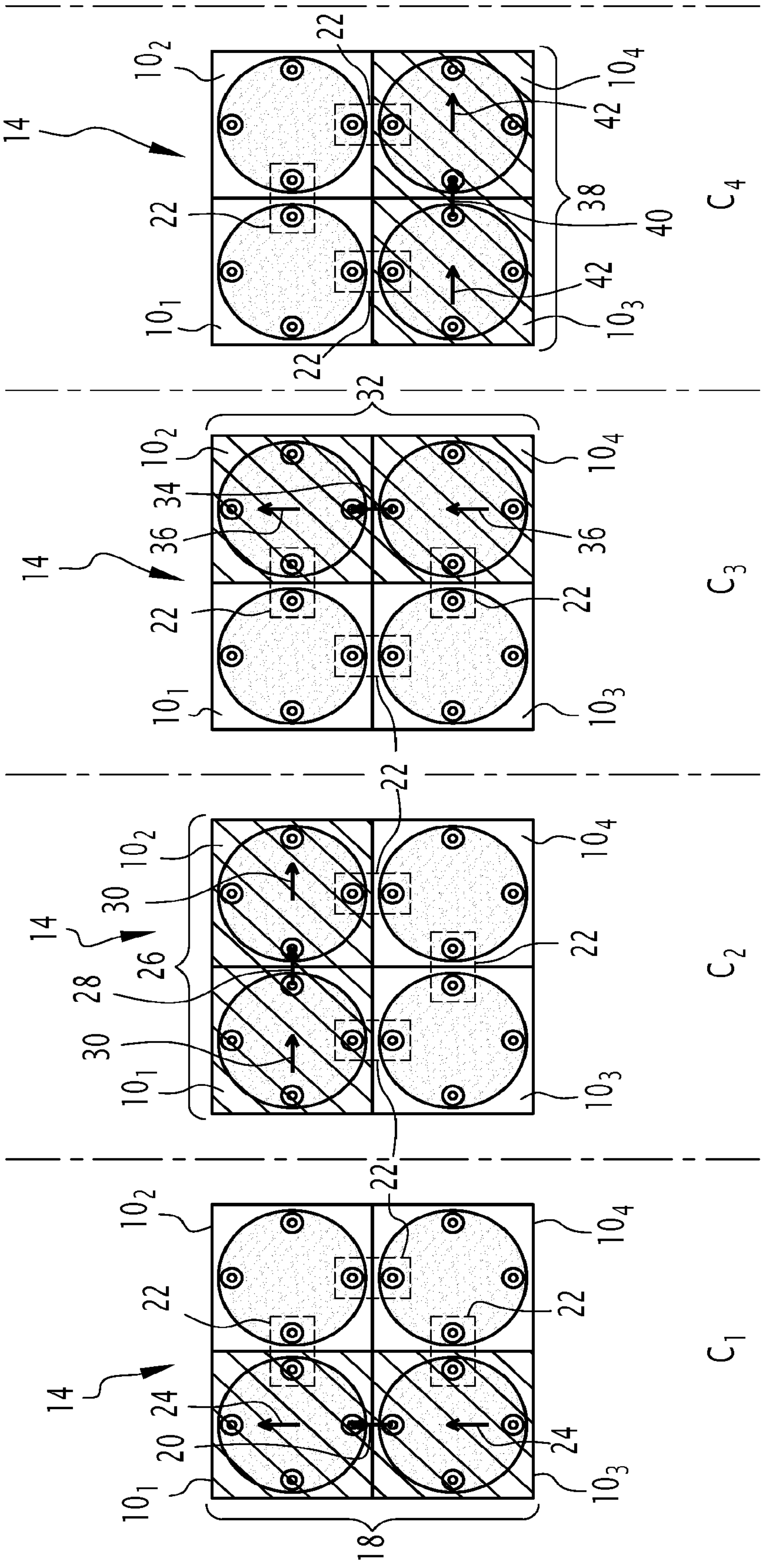
FIG. 2 illustrates four distinct radiation configurations associated with the same part of the antenna array.

FIG. 2 illustrates four distinct radiation configurations $C_1$, $C_2$, $C_3$, $C_4$ associated with the same part of antenna array 14 previously illustrated on the side B of FIG. 1. In each distinct radiation configuration $C_1$, $C_2$, $C_3$, $C_4$, the antenna which is excited, is represented as a hatched area and comprises two pixels (i.e. two elementary unit cells 10) superposed vertically, or adjacent horizontally within the antenna array or part of the antenna array 14 composed of the four elementary unit cells $\mathbf{10}_1$, $\mathbf{10}_2$, $\mathbf{10}_3$ and $\mathbf{10}_4$.

More particularly, according to the radiation configuration $C_1$, the antenna 18, represented as a hatched area, is composed of elementary unit cells $\mathbf{10}_1$ and $\mathbf{10}_3$ superposed (i.e. contiguous) vertically within the antenna array or part of the antenna array 14, and connected, via said reconfigurable switching circuit, by means of an excited connection 20 of the ports of the pair of facing ports of said at least two contiguous elementary unit cells ($\mathbf{10}_1$ and $\mathbf{10}_3$), the excited pair 20 corresponding to the left vertical pair 16 of facing ports $P_4$ and $P_2$, the port $P_4$ belonging to the upper left elementary array unit cell $\mathbf{10}_1$ while the port $P_2$ belongs to the lower left elementary array unit cell $\mathbf{10}_3$.

According to the radiation configuration $C_1$, the other pairs 22 of facing ports within the antenna array or part of the antenna array 14 are maintained via said reconfigurable switching circuit in the open-circuit state.

The excitation activated by the reconfigurable switching circuit at the pair of facing ports 20 produces an antenna 18 polarized vertically along the axis Oy represented by the arrows 24 in FIG. 2, the excitation activated by the reconfigurable switching circuit corresponding to the application of a difference of potentials between e.g. the potential $V_A^-$ associated with the port $P_2$ of the unit cell $\mathbf{10}_3$ and the potential $V_A^+$ associated with the port $P_4$ of the unit cell $\mathbf{10}_1$.

According to the radiation configuration $C_2$, the antenna 26, represented as a hatched area is composed of horizontally adjacent elementary unit cells $\mathbf{10}_1$ and $\mathbf{10}_2$ (i.e. horizontally contiguous) within the antenna array or part of the antenna array 14, and connected, via said reconfigurable switching circuit, by means of an excited connection 28 of the ports of the pair of facing ports of said at least two contiguous elementary unit cells ($\mathbf{10}_1$ and $\mathbf{10}_2$), the excited pair 28 corresponding to the upper horizontal pair 16 of facing ports $P_3$ and $P_1$, the port $P_3$ belonging to the upper left elementary array unit cell $\mathbf{10}_1$ while the port $P_3$ belongs to the horizontally adjacent upper right elementary array unit cell $\mathbf{10}_2$.

According to the radiation configuration $C_2$, the other pairs 22 of facing ports within the antenna array or part of the antenna array 14 are maintained via said reconfigurable switching circuit in the open-circuit state.

The excitation activated by the reconfigurable switching circuit at the pair of facing ports 28 produces an antenna 26 polarized horizontally along the axis Ox represented by the arrows 30 in FIG. 2, the excitation activated by the reconfigurable switching circuit corresponding to the application of a difference of potentials between e.g. the potential $V_A^+$ associated with the port $P_3$ of the unit cell $\mathbf{10}_1$ and the potential $V_A^-$ associated with the port $P_1$ of the unit cell $\mathbf{10}_2$.

According to the radiation configuration $C_3$, the antenna 32, represented as a hatched area, is composed of elementary unit cells $\mathbf{10}_2$ and $\mathbf{10}_4$ superposed (i.e. contiguous) vertically within the antenna array or part of the antenna array 14, and connected, via said reconfigurable switching circuit, by means of an excited connection 34 of the ports of the pair of facing ports of said at least two contiguous elementary unit cells ($10_2$ and $10_4$), the excited pair 34 corresponding to the right vertical pair 16 of facing ports $P_4$ and $P_2$, the port $P_4$ belonging to the upper right elementary array unit cell $10_2$ while the port $P_2$ belongs to the lower right elementary array unit cell $10_4$.

According to the radiation configuration $C_3$, the other pairs 22 of facing ports within the antenna array or part of the antenna array 14 are maintained via said reconfigurable switching circuit in the open circuit state.

The excitation activated by the reconfigurable switching circuit at the pair of facing ports 34 produces an antenna 18 polarized vertically along the axis Oy represented by the arrows 36 in FIG. 2, the excitation activated by the reconfigurable switching circuit corresponding to the application of a difference of potentials between e.g. the potential $V_A^-$ associated with the port $P_2$ of the unit cell $10_4$ and the potential $V_A^+$ associated with the port $P_4$ of the unit cell $10_2$.

According to the radiation configuration $C_4$, the antenna 38, represented as a hatched area is composed of horizontally adjacent elementary unit cells $10_3$ and $10_4$ (i.e. horizontally contiguous) within the antenna array or part of the antenna array 14, and connected, via said reconfigurable switching circuit, by means of an excited connection 40 of the ports of the pair of facing ports of said at least two contiguous elementary unit cells $10_3$ and $10_4$, the excited pair 40 corresponding to the lower horizontal pair 16 of facing ports Pa and $P_1$, the port $P_3$ belonging to the lower left elementary array unit cell $10_3$ whereas the port $P_3$ belongs to the horizontally adjacent lower right elementary array unit cell $10_4$.

According to the radiation configuration $C_2$, the other pairs 22 of facing ports within the antenna array or part of the antenna array 14 are maintained via said reconfigurable switching circuit in the open-circuit state.

The excitation activated by the reconfigurable switching circuit at the pair of facing ports 40 produces an antenna 38 polarized horizontally along the axis Ox represented by the arrows 42 in FIG. 2, the excitation activated by the reconfigurable switching circuit corresponding to the application of a difference of potentials between e.g. the potential $V_A^+$ associated with the port $P_3$ of the unit cell $10_3$ and the potential $V_A^-$ associated with the port $P_1$ of the unit cell $10_4$.

In other words, the antenna array or the antenna array part 14 is apt to provide two distinct antennas 26 and 40 polarized along the axis Ox and two other distinct antennas 18 and 32 polarized along the axis Oy, which provides polarization reconfigurability (i.e. polarization modularity) of the antenna array or part of antenna array 14 by means of a sequential selection of the arrangement of excitations between the radiating elements of each elementary unit cell forming said antenna array or said part of antenna array 14. Thereby, the antenna array or part of the antenna array 14 makes it possible, from four distinct elementary unit cells $10_1$, $10_2$, $10_3$ and $10_4$, to selectively obtain four distinct antennas 18, 26, 32 and 38, two antennas 18 and 32 of which are associated with a vertical polarization, whereas two other antennas 26 and 38 are associated with a horizontal polarization.

Such modularity is advantageous and allows optimum use of the surface of the antenna array or said part of antenna array 14, in particular compared with the technical solutions disclosed in documents U.S. Pat. No. 5,926,137 and EP 3 105 818 which require, in particular, the use of four distinct elementary unit cells for producing one antenna.

In other words, in the antenna array structure according to the present invention, the principle of the shared radiating element is implemented, the radiating element of the elementary unit cell $10_1$ being e.g. shared between the antenna 18 and the antenna 26 associated with the configurations $C_1$ and $C_2$, respectively. With the right choice of the pixel (i.e. elementary unit cell 10) and of the access points (i.e. ports) specifically and selectively excited via the reconfigurable switching circuit of the antenna array according to the present invention, it is thereby possible to use the radiating surface in an optimum way.

Figure 3:
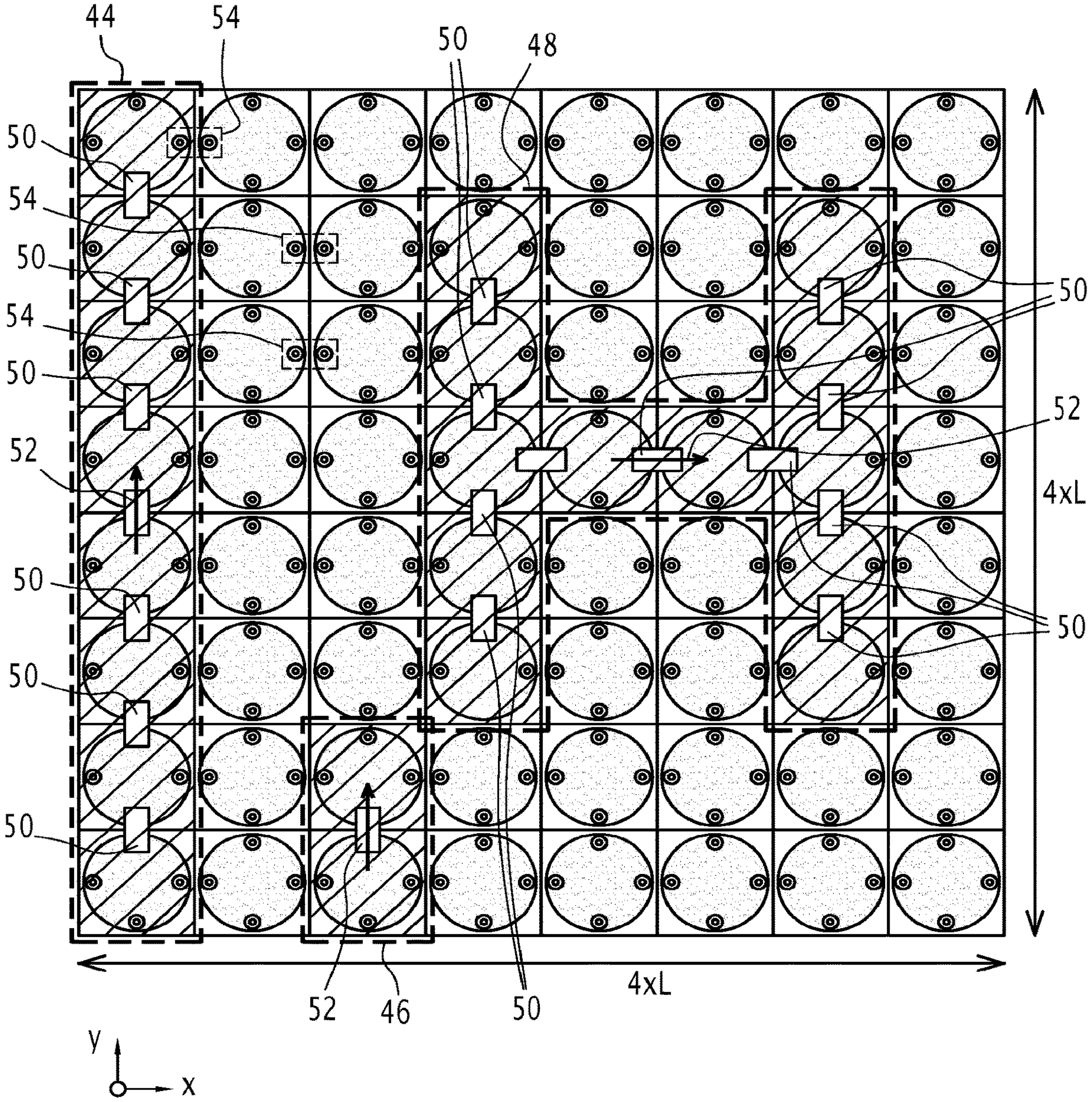
FIG. 3 illustrates another example of an antenna array according to an embodiment of the invention, the array comprising three types of sequentially selectable antennas.

Such a modularity makes it possible to develop other examples of antenna arrays such as the one illustrated in FIG. 3, of enlarged dimension 4L×4L, an elementary unit cell 10 (i.e. array pixel) having an equal surface area L/2×L/2, with L/2 the dimension of one of the four sides of the elementary unit cell 10, and hence comprising eight elementary unit cells 10 along Ox, and eight elementary unit cells 10 along Oy.

As illustrated in FIG. 3, such an antenna array is versatile in terms of possible antenna configurations and comprises e.g. at least three distinct types of antennas 44, 46, 48, synthesizable simultaneously or preferentially, in order to avoid the use of the same pixel on two different antennas, or a coupling between antennas because of the proximity thereof, such coupling being configured to modify the performance of each antenna, selectable sequentially, via the reconfigurable switching circuit of the antenna array according to the present invention, each antenna formed by at least two array pixels (i.e. elementary unit cell 10), the antenna 44 formed by eight vertically superposed pixels, the antenna 46 being formed by two vertically superposed pixels, and the antenna 48 being H-shaped and comprising two identical vertical branches, each comprising at least five vertically contiguous elementary unit cells (i.e. pixels), the two identical vertical branches being connected to each other by a horizontal central branch comprising at least four horizontally contiguous elementary unit cells, each elementary unit cell located at one of the ends of the horizontal central branch corresponding to the third elementary unit cell of each of the two vertical branches, respectively.

It should be noted that the example of FIG. 3 is intended to illustrate the possibility according to the present invention of producing a plurality of antenna shapes and/or geometries by combining elementary unit cells and reciprocal adaptation of the switching circuit, which corresponds to an optimum use of the proposed elementary unit cells. In other words, the present invention serves to produce any shape or geometry of an antenna satisfying a specific need, including shapes/geometries distinct from same presented and illustrated as examples in FIGS. 2 and 3.

Each of the antennas 44, 46, 48 are implemented by applying to each port of each pair of ports facing the elementary unit cells of the entire antenna array of FIG. 3 one of the three distinct connection states configured to be selected by the reconfigurable switching circuit implemented specifically according to the present invention, namely a short-circuit state 50, an excitation state 52 or an open-circuit state 54.

In particular, for the antenna 44, an excitation 52 is applied between the opposite accesses (i.e. ports) of the fourth and fifth vertical pixels, a short circuit 50 is applied between the other pixels forming the antenna 44, while all the accesses not concerned (i.e. adjacent to pixels of the antenna array external to antenna 44) are left in open-circuit 54. In FIG. 3, for clarity, not all the open-circuits 54 are shown, but according to the present invention it is obvious that the ports $P_3$ (as shown in FIG. 1) of each of the eight vertical pixels forming the antenna 44, are in an open-circuit state 54 with the ports $P_1$ of the horizontally adjacent set of the eight vertical pixels along a horizontal direction Ox.

For the antenna 46 composed of two pixels, an excitation 52 is applied between the opposite ports (i.e. ports) $P_2$ and $P_4$ belonging to the lower pixel and upper pixel of the antenna 46, respectively, the other ports being in the open-circuit state 54 (not shown so as not to clutter the figure).

The H-shaped antenna 48 is configured to be excited, via the reconfigurable switching circuit implemented specifically according to the present invention, by means of an excited connection 52 of the ports of the pair of ports opposite said at least two central contiguous elementary unit cells of the horizontal central branch of the H, the facing ports of the other contiguous elementary unit cells forming said H-shaped antenna 48 being placed in a short-circuit state 50, the ports facing elementary unit cells of said array external to said H-shaped antenna 48 being all placed in the open-circuit state 54 (although the above is not explicitly shown in FIG. 3 so as not to clutter FIG. 3).

Figure 4:
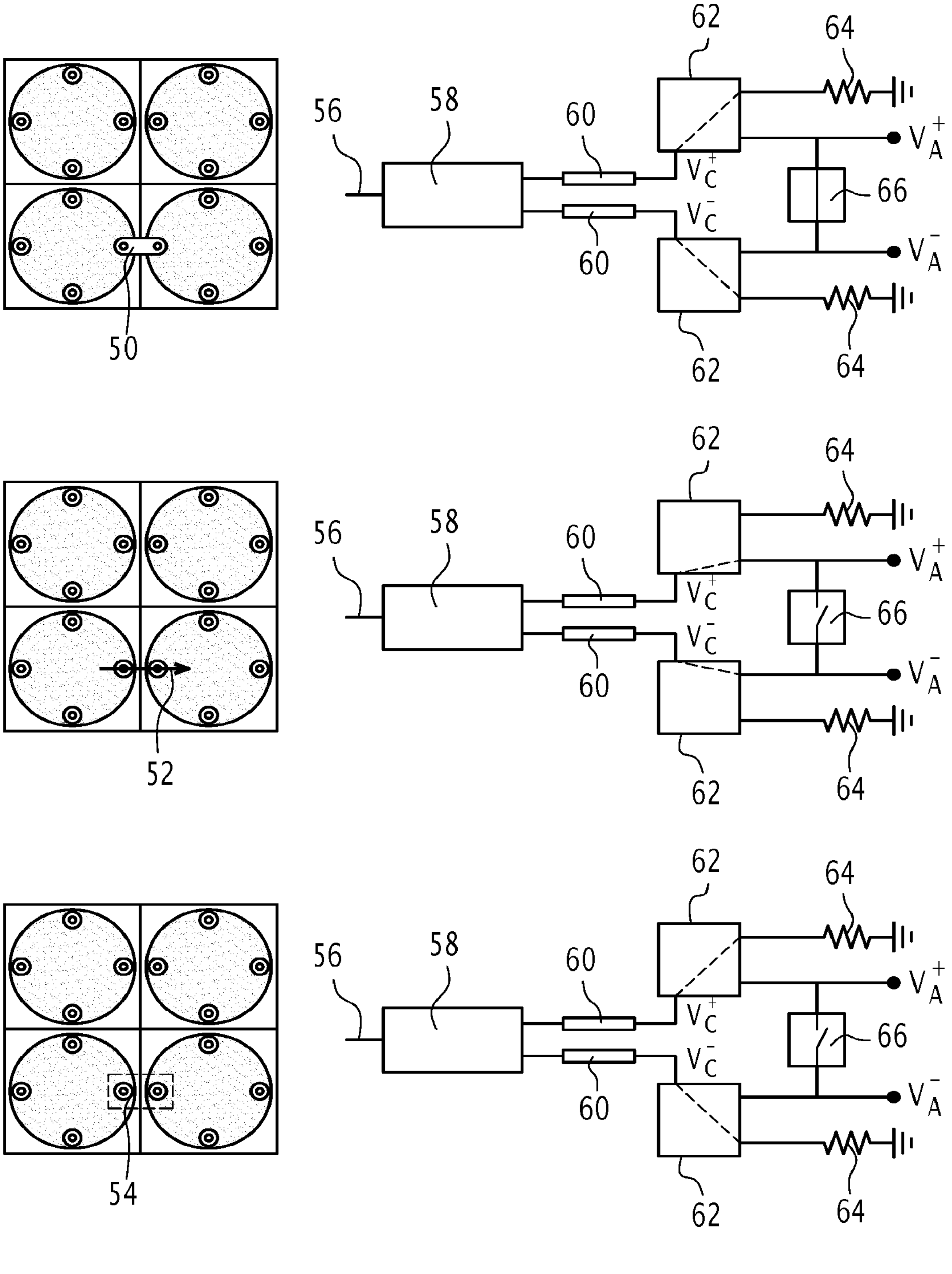
FIG. 4 illustrates the reconfigurable switching circuit of the antenna array proposed according to the present invention.

FIG. 4 illustrates the proposed reconfigurable switching circuit of the antenna array according to the present invention. Such a reconfigurable switching circuit leads to a high degree of reconfigurability and involves only three connection states (i.e. mode) at the ports (i.e. access) of each elementary unit cell (i.e. pixel). The three modes correspond to the short circuit 50, the excitation 52 and the open-circuit 54. For this purpose, a switching circuit is connected between each corresponding access (i.e. port). The architecture of the switching circuit shown in FIG. 4 illustrates that the reconfigurable switching circuit according to the present invention comprises an electronic assembly comprising at least:

- a balun (58) configured to convert an input electrical signal into a differential mode;
- two single-pole switches with one input and two SPDT (Single Pole double Throw) outputs 62,
- an SPST (Single Pole single Throw) single-jet unipolar switch 66.

More precisely, in FIG. 4, an input signal 56 is converted into differential mode by means of the balun 58, each of the two differential outputs $V_C^+$ and $V_C^-$ of which is Transmitted, via a transmission line 60, to the input of each single-pole switch with one input and two SPDT outputs 62, respectively.

Each single-pole switch with one input and two SPDT outputs 62 has two outputs, one connected via a resistive load 64, e.g. 50 Ohm, to ground, and the other connected to both the input of the single-pole single-jet switch 66, and at the potential vi for the single-pole switch to one input and two SPDT outputs 62 connected to the input to the differential output $V_C^+$, and to the potential $V_A^-$, respectively, for the single-pole switch to one input and two SPDT outputs 62 connected to the input to the differential output $V_C^-$.

According to the present invention, in the short-circuit state 50, the differential outputs $V_C^+$ and $V_C^-$ are oriented towards the resistive loads 64, and the SPST single-pole single-jet switch 66 is closed.

In the excitation state 52, the differential outputs $V_C^+$ and $V_C^-$ are oriented towards the potentials $V_A^+$ and $V_A^-$, respectively, and the SPST single-jet single-pole switch 66 is open.

In the open-circuit state, the differential outputs $V_C^+$ and $V_C^-$ are oriented towards to the resistive loads 64, respectively, and the SPST single-jet single-pole switch 66 is open.

Figure 5:
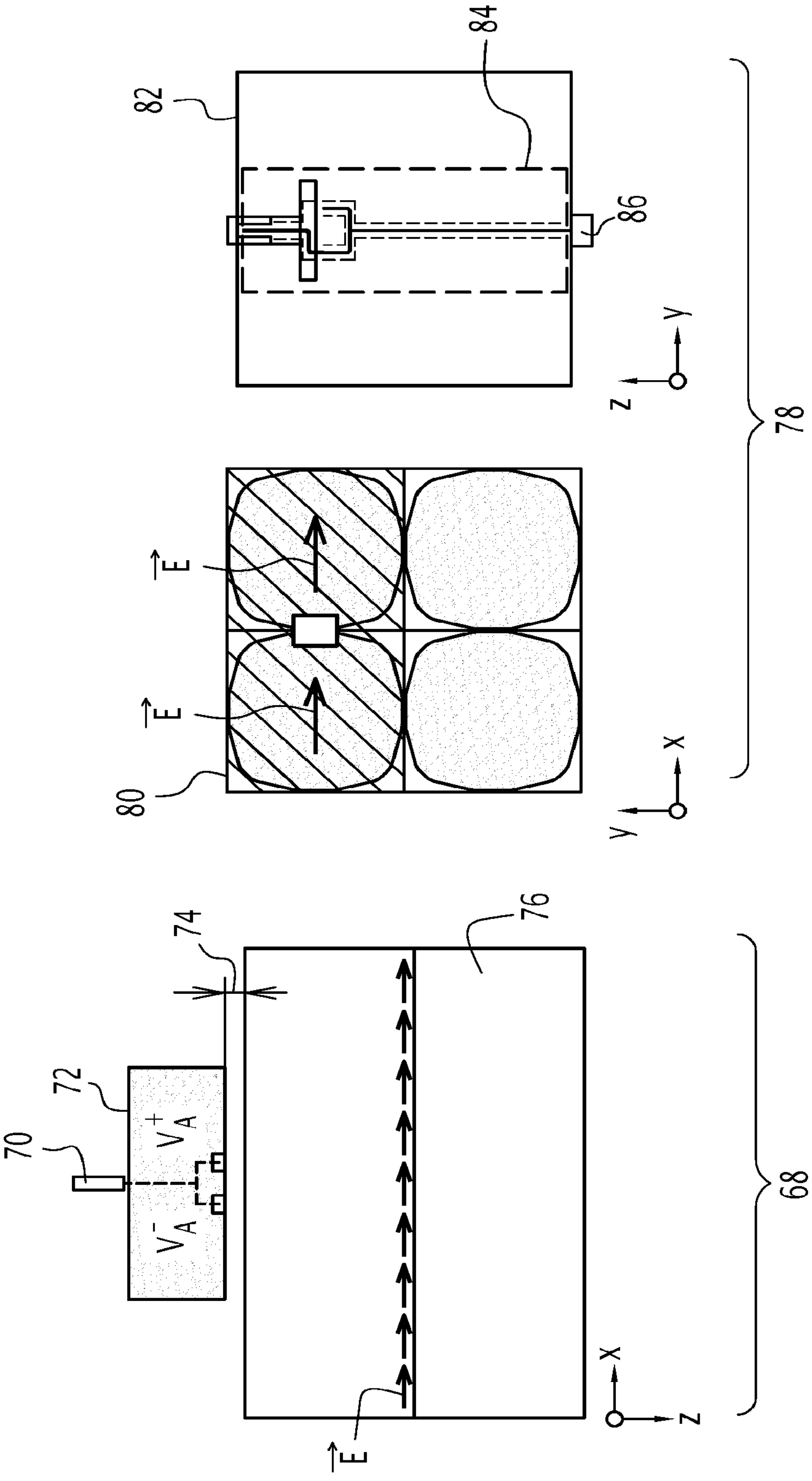
FIG. 5 illustrates the application of the antenna array according to the present invention to a ground-penetrating radar.

FIG. 5 illustrates the electromagnetic simulation environment 68 of the application of the antenna array according to the present invention to a ground-penetrating radar.

More precisely, according to FIG. 5, a power supply 70 feeds such a ground-penetrating GPR radar 72 suitable for the study of the composition and structure of the ground, and especially the detection and location of objects buried in the ground. Such a radar being placed at a distance 74 suitable for emulating a GPR scenario, e.g. equal to 15 mm from the ground 76, the permittivity of which is e.g. $\varepsilon_r$=15, and the loss tangent tan δ=0.1, the ground-penetrating radar 72 being apt to generate an electric field E within the ground as illustrated in FIG. 5.

According to the present example, the radiating element 12 of FIG. 1 corresponding to a circular pattern is replaced by an alternative quasi-rectangular shape, the pixel geometry having, according to the present example, been optimized so as to minimize the reflection coefficient of $S_{11}$ of the antenna 80 seen from above, represented as a hatched area and composed of two pixels each comprising such a quasi-rectangular radiating element, represented with a dotted texture within the pixel (i.e. elementary unit cell) with a square shape, the side of which measuring e.g. 100 mm, so that an antenna array 78 consisting of four elementary unit cells contiguous in pairs, in a similar way to the antenna array shown in FIG. 2, vertically and horizontally, occupies a flat surface equal to 200 mm×200 mm.

According to the example shown in FIG. 5 dedicated to the application 68 of the antenna array to a ground-penetrating radar, each elementary unit cell is advantageously placed in an electromagnetic cubic cavity, so as to focus the radiation from the antenna array towards the ground and avoid any interference with RF applications above the ground. For example, the height of the cavity is 100 mm.

In a way not shown, because within a GPR system, the antenna should have the lowest time dispersion in order to avoid an overlap between the direct coupling between the transmitting antenna Tx and the receiving antenna Rx and also the echo of the target, in order to reduce the time dispersion, four resistive loads, not shown in FIG. 5, are added in particular between the pixel and the four upper corners of the surrounding cavity.

As described hereinabove with reference to FIGS. 1 and 2, from an antenna array consisting of four elementary unit cells contiguous in pairs, vertically and horizontally according to the present invention, it is possible to produce four antenna configurations (two polarized horizontally along Ox and two polarized vertically along Oy).

According to the example shown in FIG. 5 corresponding to an optional aspect of the present invention, each electronic assembly of the reconfigurable switching circuit specifically proposed according to the present invention and associated with each pair of facing ports, is integrated within a metal wall of said cubic cavity, said wall separating said ports of said pair, as illustrated in the side view 82 of the wall shown in FIG. 5 where the reconfigurable switching circuit 84 specifically proposed according to the present invention and the power supply 86 thereof, are integrated. Such use of cavity walls serves to produce transmission lines.

According to another aspect, not shown in FIG. 5 representing, in a similar way to FIG. 2, a dual polarization antenna array comprising four elementary unit cells (2×2) serving to obtain four distinct configurations of antennas, namely two horizontally polarized antennas and two vertically polarized antennas, such an application 68 of the antenna array to a ground-penetrating radar is suitable for requiring multi-antenna system with an ultra-wideband UWB permitted by an antenna array according to the present invention comprising other antenna configurations (in polarization and/or geometry). For example, another antenna array according to the present invention comprising three distinct antenna geometries (not shown), namely vertical with two pixels, vertical with four pixels, and H-shaped with two identical horizontal branches, each comprising at least five horizontally contiguous elementary unit cells (i.e. pixels), the two identical horizontal branches being connected to each other by a vertical central branch comprising at least four vertically contiguous elementary unit cells, is suitable for use as an alternative to meet other needs. The three geometries can be sequentially selected via the reconfigurable switching circuit of the antenna array according to the present invention. The three distinct antenna geometries are in fact suitable for exhibiting UWB behaviors useful for the application referred to in FIG. 5 while exhibiting distinct efficiencies, the vertical antenna with four pixels and the aforementioned H-shaped antenna with two horizontal branches, due to the greater electrical size thereof, being more efficient in the low frequency bands for detecting deep targets for a GPR application and having an improvement in gain level compared to a vertical two-pixel antenna.

It should be noted that the antenna array according to the present invention has an architecture suitable for being reconfigured as desired, according to the application, in order to obtain a desired resolution or a desired detection direction. More particularly, depending on the needs, the aforementioned H-shape is not optimal and is indicated above just as an example, the architecture of the antenna array according to the present invention serving to use other antenna configurations having e.g. higher performance than the aforementioned H-shape on predetermined low frequency bands.

It should be noted that the size of the antenna (formed by a plurality of elementary unit cells according to the activated configuration) is a key element that defines the operation frequency thereof, which is an important parameter for the GPR application. With the solution proposed according to the present invention, it is possible to reduce or increase the operation frequency of the antenna by changing the number of unit cell(s) which form(s) the antenna.

Thus, the geometrical reconfiguration obtained by means of the present invention, and as illustrated previously also by FIG. 3, is apt to contribute significantly to the improvement of the performance of a GPR system, the reconfiguration providing a degree of freedom in order to synthesize the performance of the antenna according to the instantaneous needs of the system, and serving to develop even more antennas the geometry of which is not limited to a specific number of pixels.

A person skilled in the art would understand that the invention is not limited to the embodiments described, nor to the particular examples of the description, the above-mentioned embodiments and variants being suitable for being combined with one another so as to generate new embodiments of the invention.

The present invention thereby serves to reconfigure the antenna geometry according to the system need corresponding e.g. to the need and/or to shift the operation frequency thereof to widen the electrical size (height and/or width) of the antenna so to increase the radiation efficiency thereof and the gain thereof, to the need to move the phase center of the excited antenna on the surface of the array, to the need to multiply the number of sources for densifying (decreasing the space between elements (i.e. the elementary unit cell size in order to reduce the space between the antennas, the reduction of the elementary unit cell size involving a decrease in the inter-element space) in the high frequency bands, to the need to change the polarization of the elementary unit cells so as to use the polarization properties, to the need to load antenna ends so as to attenuate the phenomena of internal reflections at the end of the line apt to deform the transmitted signals in time (ringing) (useful in ground radar application) but also to attenuate the inter-element coupling (i.e. between elementary unit cells), while remaining reconfigurable at the request of the telecommunication or radar system suitable for integrating the antenna array according to the present invention.

Indeed, as seen hereinabove, starting from one pixel (i.e. elementary unit cell) with four accesses (i.e. ports), a part of an antenna array including, according to a first example, 2×2 pixels can be designed in particular according to the present invention, from which it is possible to configure the excitation of the neighbor (i.e. facing each other) accesses (i.e. ports), by means of the integration of an RF switching circuit (otherwise called a feed array) 5 so as to produce four antennas polarized either along Ox or along Oy.

Such an RF switching circuit makes it possible to impose a specific excitation mode on each access (i.e. port) to excite antennas of larger electrical size and thus makes it possible to optimally use the surface occupied by radiating elements, in particular for an application to an antenna array for ground-penetrating radar (GPR), or to an antenna array 10 for spectrum monitoring and goniometry, or even for any telecommunication or radar application where the spectrum is scanned in successive sub-bands or using multiple polarizations successively.

The invention claimed is:

1. A reconfigurable antenna array, comprising:

a plurality of identical elementary unit cells, each elementary unit cell having at least one symmetry and being a square cell, and comprising a radiating element having at least four ports distributed in pairs of facing ports on either side of each median on one side of the elementary unit cell, wherein the antenna array further comprises a reconfigurable switching circuit configured to impose a specific excitation mode on each of the ports while being configured to generate three distinct connection states between each port of each pair of the facing ports, each port of a given pair of facing ports belonging to two distinct elementary unit cells of the plurality of elementary unit cells, superimposed vertically or adjacent horizontally, within said antenna array.

2. The antenna array according to claim 1, wherein the three connection states correspond to:

a short circuit;

an excitation; and an open-circuit.

3. The antenna array according to claim 1, wherein the radiating element within each of the elementary unit cells corresponds to a circular pattern.

4. The antenna array according to claim 1, wherein at least one antenna of said antenna array is formed of at least two vertically and/or horizontally contiguous elementary unit cells of the plurality of elementary unit cells, said at least two contiguous elementary unit cells being connected, via said reconfigurable switching circuit, by means of an excited connection of the ports of the pair of the facing ports facing said at least two contiguous elementary unit cells.

5. The antenna array according to claim 1, wherein at least a part of said antenna array is square and is formed by four elementary unit cells, of the plurality of elementary unit cells, contiguous in pairs, vertically and horizontally, and configured to be excited in four distinct configurations, associated, via said reconfigurable switching circuit, to a distinct arrangement from one configuration to another, of connections between each port of each pair of the facing ports, respectively, each port of a given pair belonging to two of the distinct elementary unit cells superposed vertically or horizontally within said square part formed by the four elementary unit cells contiguous in pairs, vertically and horizontally.

6. The antenna array according to claim 5, wherein two of four distinct configurations are associated with horizontal polarization and two other of said four distinct configurations are associated with vertical polarization.

7. The antenna array according to claim 1, wherein at least one antenna of said antenna array is H-shaped and comprises two identical vertical branches, each comprising at least five vertically contiguous elementary unit cells of the plurality of elementary unit cells, the two identical vertical branches being connected to each other by a horizontal central branch comprising at least four horizontally contiguous elementary unit cells of the plurality of elementary unit cells, each elementary unit cell located at one of ends of the horizontal central branch corresponding to the third elementary unit cell of each of the two vertical branches, respectively.

8. The antenna array according to claim 7, wherein said H-shaped antenna is configured to be excited, via the switching circuit, by means of an excited connection of the ports of the pair of the facing ports facing at least two central contiguous elementary unit cells of said horizontal central branch, the facing ports of the other contiguous elementary unit cells forming said H-shaped antenna being placed in a short-circuit state, the facing ports of elementary unit cells of said array that are external to said H-shaped antenna being placed in an open-circuit state.

9. The antenna array according to claim 1, wherein, for each pair of the facing ports, belonging to two distinct elementary unit cells, of the plurality of elementary unit cells, superposed vertically or horizontally, the reconfigurable switching circuit comprises an electronic assembly comprising:

- a balun configured to convert an input electrical signal into a differential mode;
- two single-pole switches with one input and two single pole single throw (SPDT) outputs, and
- an SPST single-jet single-pole switch.

10. The antenna array according to claim 1, wherein each elementary unit cell of the plurality of elementary unit cells is located in an electromagnetic cubic cavity.

11. The antenna array according to claim 10,

- wherein, for each pair of the facing ports, belonging to two distinct elementary unit cells, of the plurality of elementary unit cells, superposed vertically or horizontally, the reconfigurable switching circuit comprises an electronic assembly comprising at least a balun configured to convert an input electrical signal into a differential mode, two single-pole switches with one input and two SPDT outputs, and an SPST single-jet pole switch, and
- each electronic assembly associated with each pair of the facing ports is integrated within a metal wall of said cubic cavity, said wall separating said ports of said pair.

12. A ground-penetrating radar comprising the reconfigurable antenna array according to claim 10.

* * * * *